United States Patent
Michel et al.

(10) Patent No.: US 9,488,252 B2
(45) Date of Patent: Nov. 8, 2016

(54) HAND BRAKE ASSEMBLY (71) Applicant: AMSTED RAIL-FAIVELEY LLC, Greenville, SC (US)

(72) Inventors: Mark Michel, Columbia, SC (US); Deon Glenn, Union, SC (US); Tammy Kirk, Taylors, SC (US)

(73) Assignee: Amsted Rail-Faiveley LLC, Greenville, SC (US)

( * ) Notice: Subject to any disclaimer, the term of this patent is extended or adjusted under 35 U.S.C. 154(b) by 0 days.

(21) Appl. No.: 14/663,867

(22) Filed: Mar. 20, 2015

(65) Prior Publication Data

US 2016/0273628 A1 Sep. 22, 2016

(51) Int. Cl.
*F16H 19/06* (2006.01)
*B61H 13/04* (2006.01)
*B61H 13/34* (2006.01)

(52) U.S. Cl.
CPC .............. *F16H 19/06* (2013.01); *B61H 13/04* (2013.01); *B61H 13/34* (2013.01)

(58) Field of Classification Search
CPC . B60T 17/228; B61H 13/04; Y10T 74/2048; Y10T 74/20642
See application file for complete search history.

(56) References Cited

U.S. PATENT DOCUMENTS

| | | | | |
|---|---|---|---|---|
| 2,112,235 A | * | 3/1938 | Camp | B61H 13/04 188/82.3 |
| 3,668,944 A | * | 6/1972 | Natschke | B61H 13/04 74/505 |
| 8,123,004 B2 | * | 2/2012 | Klasing | B61H 13/04 188/107 |

* cited by examiner

*Primary Examiner* — Thomas Diaz
(74) *Attorney, Agent, or Firm* — Dority & Manning, P.A.

(57) ABSTRACT

A hand brake assembly for a railway car is provided including a housing with a back plate, a cover plate, and a removable panel removably attached to the back plate, the cover plate, or both. The removable panel mounts at least a portion of a shaft of a quick-release handle in the housing when the removable panel is attached to the back plate, the cover plate, or both.

16 Claims, 5 Drawing Sheets

HAND BRAKE ASSEMBLY

FIELD OF THE INVENTION

The present invention generally relates to a brake mechanism for a railway car, or more particularly to a hand operated brake assembly for a railway car.

BACKGROUND OF THE INVENTION

Railway cars are widely used for transportation of goods and passengers throughout the United States and abroad. Railway cars generally include one or more truck assemblies including a plurality of specially designed wheels for traveling along a vast infrastructure of railway car tracks. Braking systems are generally disposed between adjacent pairs of wheels for facilitating the stopping or slowing down of the railway car.

Railway car hand brake assemblies may be provided for manually actuating the braking system of the railway car. The hand brake assemblies generally include a relatively large, rotatable hand wheel disposed in a substantially vertical plane, which, through a gear train, can rotate a chain drum in order to wind up a chain that is secured at one end to the braking system. Accordingly, as the hand wheel is rotated in a tightening direction, the brakes are applied, and conversely when the hand wheel is rotated in an opposite loosening direction, the brakes are released.

Certain hand brake assemblies further include a clutch mechanism for facilitating a quick-release of the brakes. The quick-release effect of the clutch is activated by a handle attached to an end of a shaft. Accordingly, actuating the handle may disengage the clutch and thereby allow for free rotation of the gear train to release a chain load.

Moreover, certain hand brake assemblies include a housing formed of a back plate and a cover plate attached thereto. The back plate and cover plate together define a cavity for the gear train. The shaft extends through an opening of the cover plate to attach to the handle. However, certain problems may exist with such a configuration. For example, the shaft having the handle attached thereto may receive a large amount of force during operation of the hand brake assembly. Additionally, due to the construction of the housing of the hand brake assembly, if one or more components of the shaft having handle attached thereto fails, the entire cover plate must be removed in order to repair the part.

Accordingly, a hand brake assembly that would allow for repair of one or more portions of the hand brake assembly without removal of the entire cover plate would be beneficial. Moreover, a hand brake assembly that could reduce the risk of failure of one or more portions of the hand brake assembly would be particularly useful.

BRIEF DESCRIPTION OF THE INVENTION

Aspects and advantages of the invention are set forth below in the following description, or may be obvious from the description, or may be learned through practice of the invention.

In one exemplary embodiment of the present disclosure, a hand brake assembly is provided for connection with a braking mechanism of a railway car. The hand brake assembly includes a gear train for engaging and disengaging the braking mechanism of the railway car, a quick-release handle operably connected to the gear train and including a shaft, and a housing. The housing encloses at least a portion of the gear train and the shaft of the quick release handle. The housing includes a back plate, a cover plate attached to the back plate, and a removable panel. The removable panel is removably attached to one or both of the back plate and the cover plate, and at least a portion of the shaft of the quick-release handle is rotatably mounted in the housing by the removable panel when the removable panel is attached to the housing.

In another exemplary embodiment of the present disclosure, a hand brake assembly is provided for connection with a braking mechanism of a railway car. The hand brake assembly includes a housing having a back plate, a cover plate, and a panel removably attached to one or both of the back plate and the cover plate. The hand brake assembly also includes a first handle positioned outside the housing and adjacent to the housing and a first gear rotatably mounted in the housing in operative engagement with the braking mechanism of the railway car. Additionally, the hand brake assembly includes a clutch moveable between an engaged position in which the first gear is operatively engaged with the first handle and a disengaged position in which the first gear is disengaged with the first handle. The hand brake assembly also includes a second, quick-release handle. The quick release handle is operatively connected to the clutch for moving the clutch into the disengaged position. The quick-release handle includes a shaft, the panel of the housing mounting at least a portion of the shaft of the quick-release handle in the housing when the panel is attached to one or both of the back plate and the cover plate.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment.

Thus, it is intended that the present invention covers such modifications and variations as come within the scope of the appended claims and their equivalents.

As used herein, the terms "front" and "rear" and "top" and "bottom" may be used to describe certain components relative to one another, it being understood that the orientation of the components may be altered depending on a mounting location and orientation of the hand brake assembly.

Various embodiments of the present invention include a hand brake assembly for a railway car including one or more features to improve the durability of the quick release function of the hand brake assembly and allow for easier repair and/or replacement of certain components of the hand brake assembly. For example, certain embodiments of the present disclosure include a housing for a hand brake assembly having a removable panel adjacent to one or more of the quick release components in the hand brake assembly.

Figure 1:
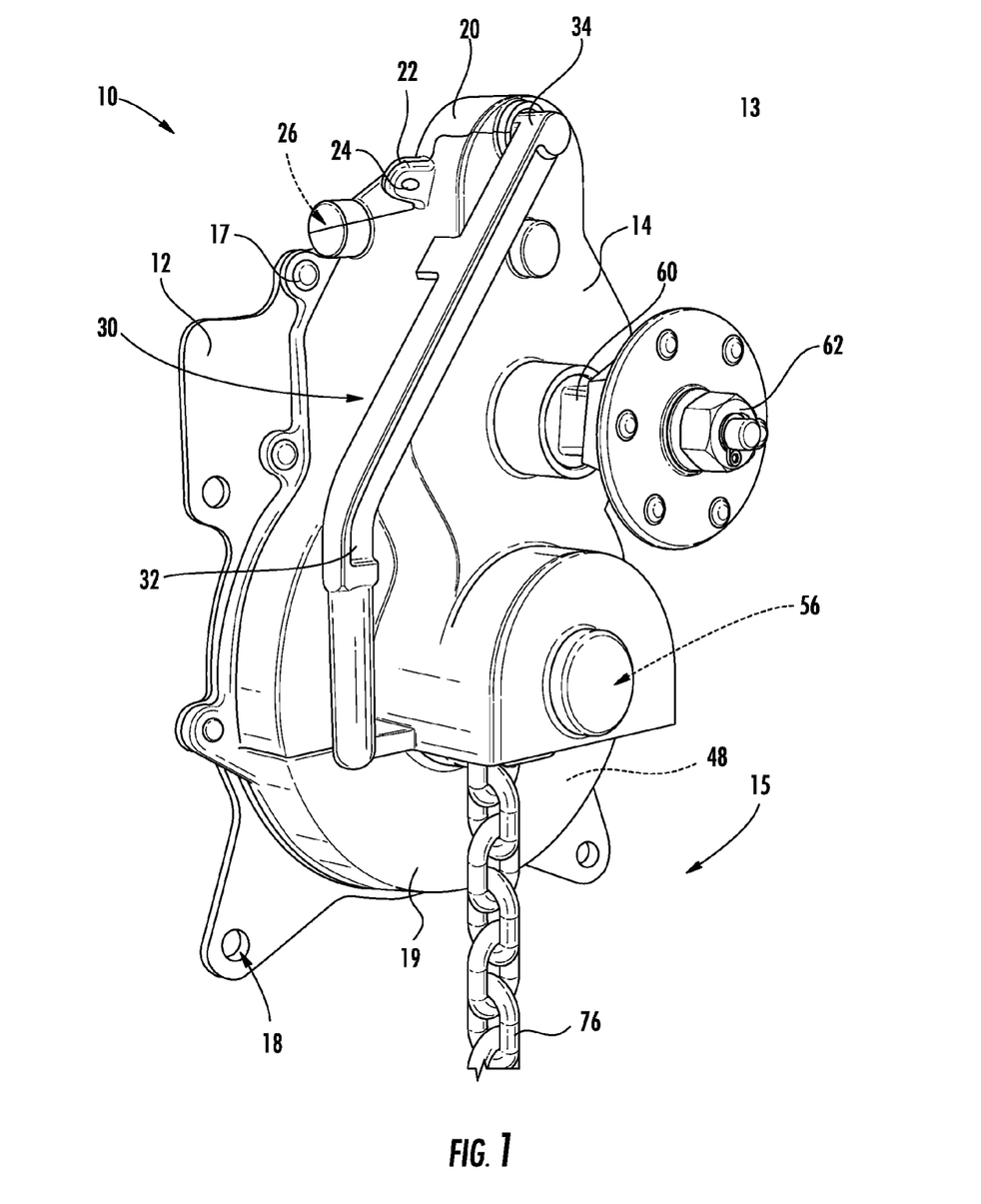
FIG. 1 is perspective view of a hand brake assembly in accordance with an exemplary embodiment of the present disclosure.
Figure 2:
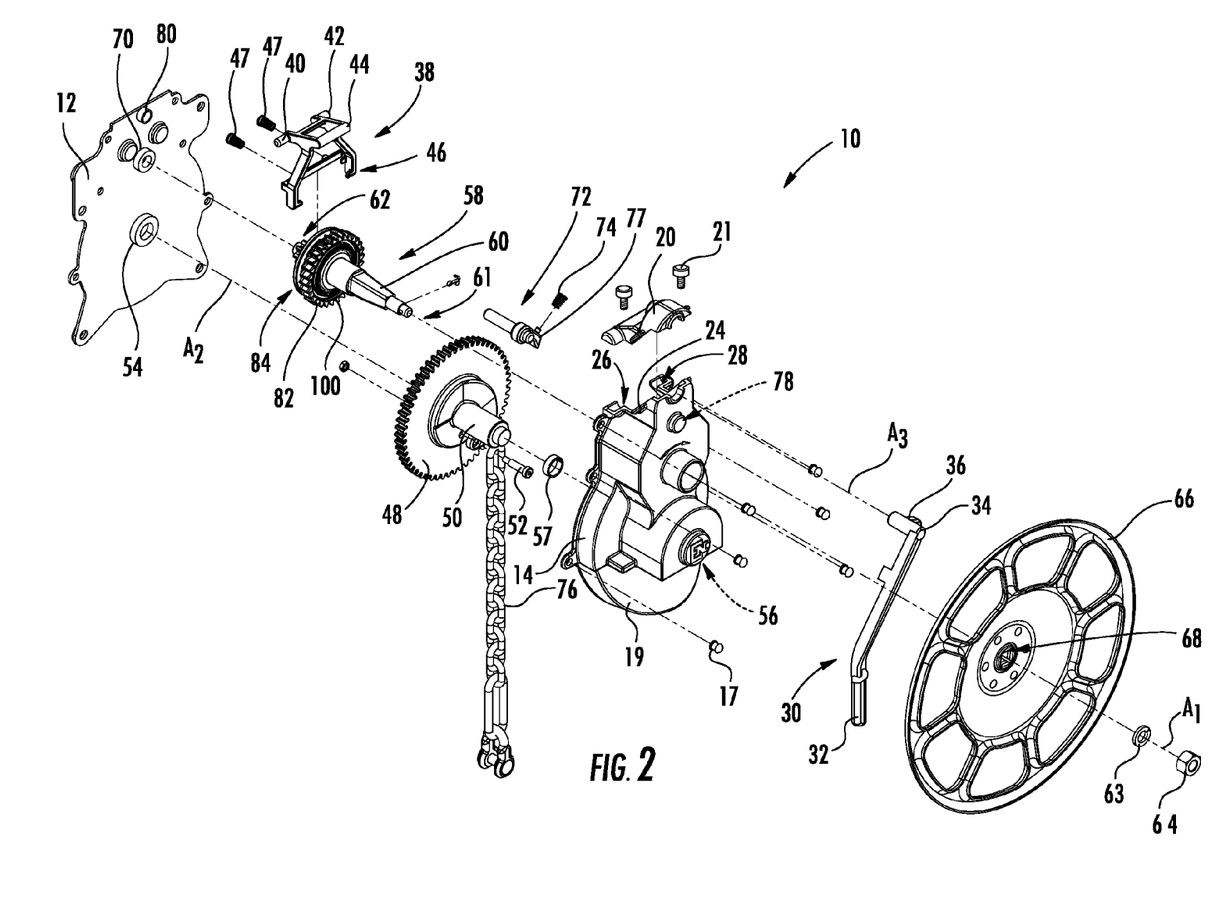
FIG. 2 is an exploded perspective view of the exemplary hand brake assembly depicted in FIG. 1.
Figure 3:
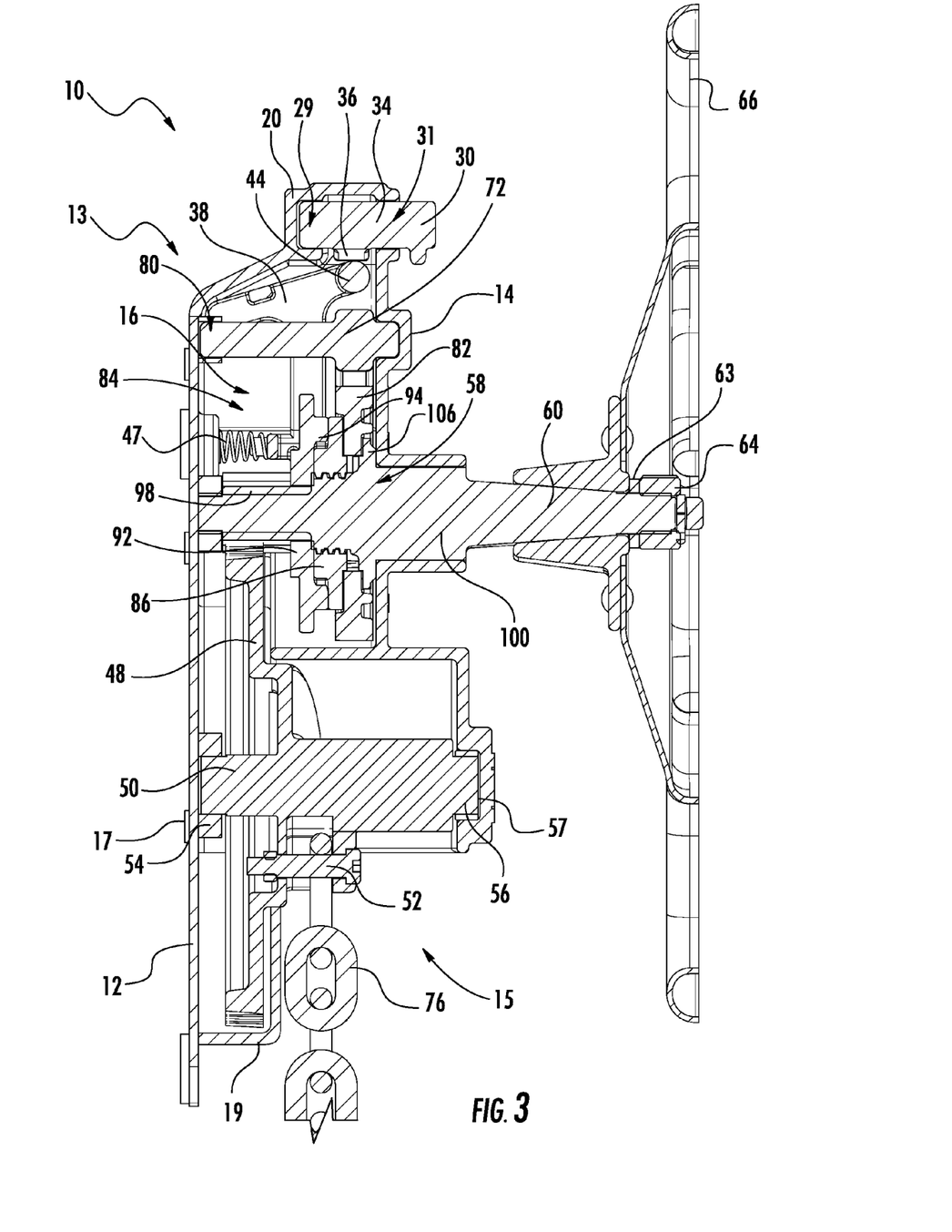
FIG. 3 is a cross-sectional side view of the hand brake assembly depicted in FIG. 1, with a clutch mechanism in an engaged position.

Referring now to the FIGS., FIGS. 1 through 3 depict a hand brake assembly 10 in accordance with an exemplary embodiment of the present disclosure. FIG. 1 provides a perspective view of the exemplary hand brake assembly 10, FIG. 2 provides an exploded perspective view of the exemplary assembly 10, and FIG. 3 provides a cross-sectional side view of the exemplary hand brake assembly 10.

The hand brake assembly 10 depicted is configured for connection with a braking mechanism of a railway car (not shown) and includes a housing 11 defining a top end 13 and a bottom end 15. Additionally, the housing 11 includes a back plate 12 and a cover plate 14, the cover plate 14 attached to the back plate 12 with a plurality of rivets 17. Moreover, the back plate 12 defines a plurality of attachment points 18 for mounting the hand brake assembly 10 in a suitable location. One or both of the back plate 12 and the cover plate 14 may be formed by casting, stamping, or by using any other suitable method.

The hand brake assembly 10 additionally includes a first handle 66 (FIGS. 2 and 3) positioned outside the housing and adjacent to the housing 11, which for the embodiment of FIGS. 1 through 3 is a round hand wheel. The first handle 66 is attached to a gear train 16 for engaging and disengaging the braking mechanism of the railway car (not shown). The housing 11 surrounds at least a portion of the gear train 16. As is depicted, the gear train 16 includes a first gear 48 rotatably mounted in the housing 11. For the exemplary embodiment depicted in FIGS. 1 through 3, the cover plate 14 of the housing 11 defines an opening at the bottom end 15. A cover 19 is attached to the cover plate 14 over the opening such that the first gear 48 is completely enclosed by the housing 11. It should be appreciated, however, that in other exemplary embodiments, the housing 11 may not include the cover 19 attached to the cover plate 14 at the bottom end 15 and the housing 11, and the first gear train 48 may be at least partially exposed.

The first gear 48 includes a gear shaft 50 extending along an axial direction $A_2$ (FIG. 2) between a recess 56 in the cover plate 14 and a bearing 54, the bearing 54 mounting the shaft 50 against the back plate 12. The first gear 48 is in operative engagement with the braking mechanism of the railway car (not shown) through a connection chain 76—the first gear 48 including an attachment piece, or more particularly an attachment pin 52, for attaching the connection chain 76 to the first gear 48. It should be appreciated, however, that in other exemplary embodiments, the connection chain 76 may instead be a rope, a cord, a wire, or any other suitable connection means and/or may be attached to the first gear 48 in any other suitable manner. For example, the shaft 50 may define a plurality of circumferentially spaced pockets configured to receive individual links in the chain 76.

The hand brake assembly 10 additionally includes a quick-release handle 30 including a handle portion 32, a shaft 34 extending along an axial direction $A_3$ (FIG. 2), and a cam 36 extending outwardly from the shaft 34 along a radial direction defined by the shaft 34 (the radial direction of the shaft 34 being perpendicular to the axial direction $A_3$ of the shaft 34). For the exemplary embodiment of FIGS. 1 through 3, the quick-release handle 30, including the shaft 34 and cam 36, is formed integrally as a single piece by casting. In other exemplary embodiments, however, the quick release handle, including the shaft 34 and cam 36 may be formed integrally as a single piece by welding a plurality of parts together. Forming the quick-release handle 30 integrally may allow for a stronger and more durable handle 30 than if the handle 30 were made of a plurality of separate parts. However, in still other embodiments, the handle 30 may be comprised of a plurality of separate parts.

At least a portion of the shaft 34 of the quick-release handle 30 is mounted in the housing 11 of the hand brake assembly 10 by a removable panel 20 of the housing 11. More particularly, the removable panel 20 defines a recess 29 (FIG. 3) for receipt of a distal end the shaft 34 of the quick-release handle 30, and the removable panel 20 and the cover plate 14 together define an opening 31 (FIG. 3) through which the shaft 34 of the quick release handle 30 extends. Additionally, the cam 36 of the handle 30 is positioned within the housing 11 and prevents removal of the shaft 34 of the quick-release handle 30 from the housing 11 through opening 31 when the panel 20 is attached to the cover plate 14. For example, as depicted in FIG. 3 (and in FIG. 4, discussed below), the cam 36 may abut an interior surface of the panel 20 and/or cover panel 14 adjacent to the opening 31, preventing the shaft 34 of the handle 30 from moving along the axial direction $A_3$ away from the housing 11.

The removable panel 20 is removably attached to one or both of the back plate 12 and the cover plate 14 by a plurality of bolts 21. More particularly, for the embodiment depicted in FIGS. 1 through 3, the removable panel 20 is attached to the cover plate 14 at the top end 13 of the housing 11. It should be appreciated, however, that in other exemplary embodiments, the removable panel 20 may be removably attached to one or both of the backplate 12 and the cover plate 14 in any other suitable manner.

As will be discussed below, the quick-release handle 30 is operably connected to the gear train 16 to allow a user to quickly disengage the braking mechanism of the railway car by moving, or rotating, the quick-release handle 30 about the axial direction $A_3$ of the shaft 34 of the handle 30. Moreover, due to the unified construction of the quick-release handle 30, the handle 30 may withstand greater forces, and therefore may be a more durable design. However, in the instance in which the quick-release handle 30, and/or other components adjacent thereto, fail during operation of the hand brake assembly 10, the components may be more easily repaired or replaced by removing the removable panel 20, while the cover plate 14 remains permanently attached to the back plate 12. Accordingly, such a configuration allows for repair or replacement of the handle 30, including the shaft 34 and cam 36, and other components of the gear train 16 proximate thereto without taking apart various other components of the housing 11.

Figure 4:
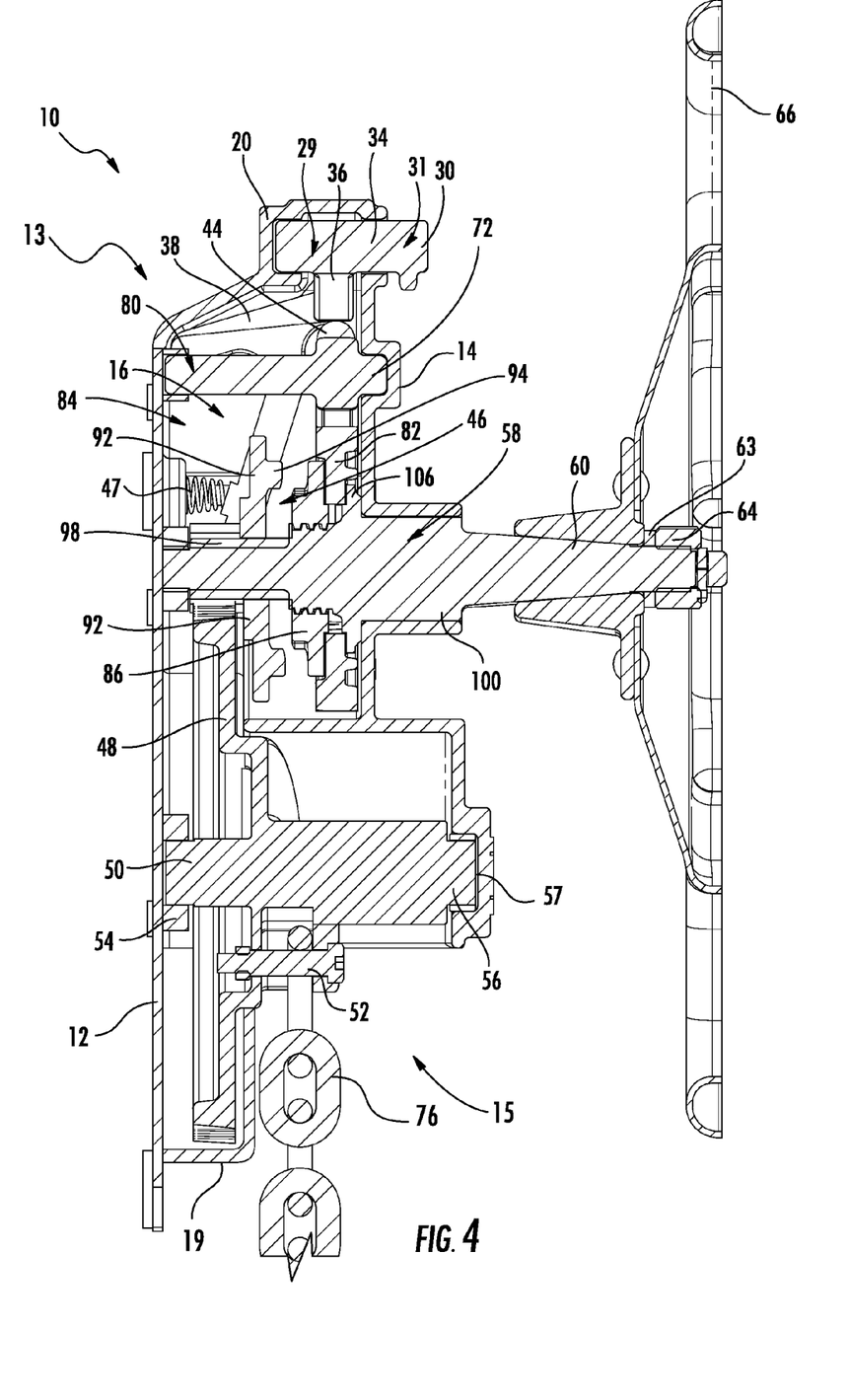
FIG. 4 is a cross-sectional side view of the hand brake assembly depicted in FIG. 1, with the clutch mechanism in a disengaged position.
Figure 5:
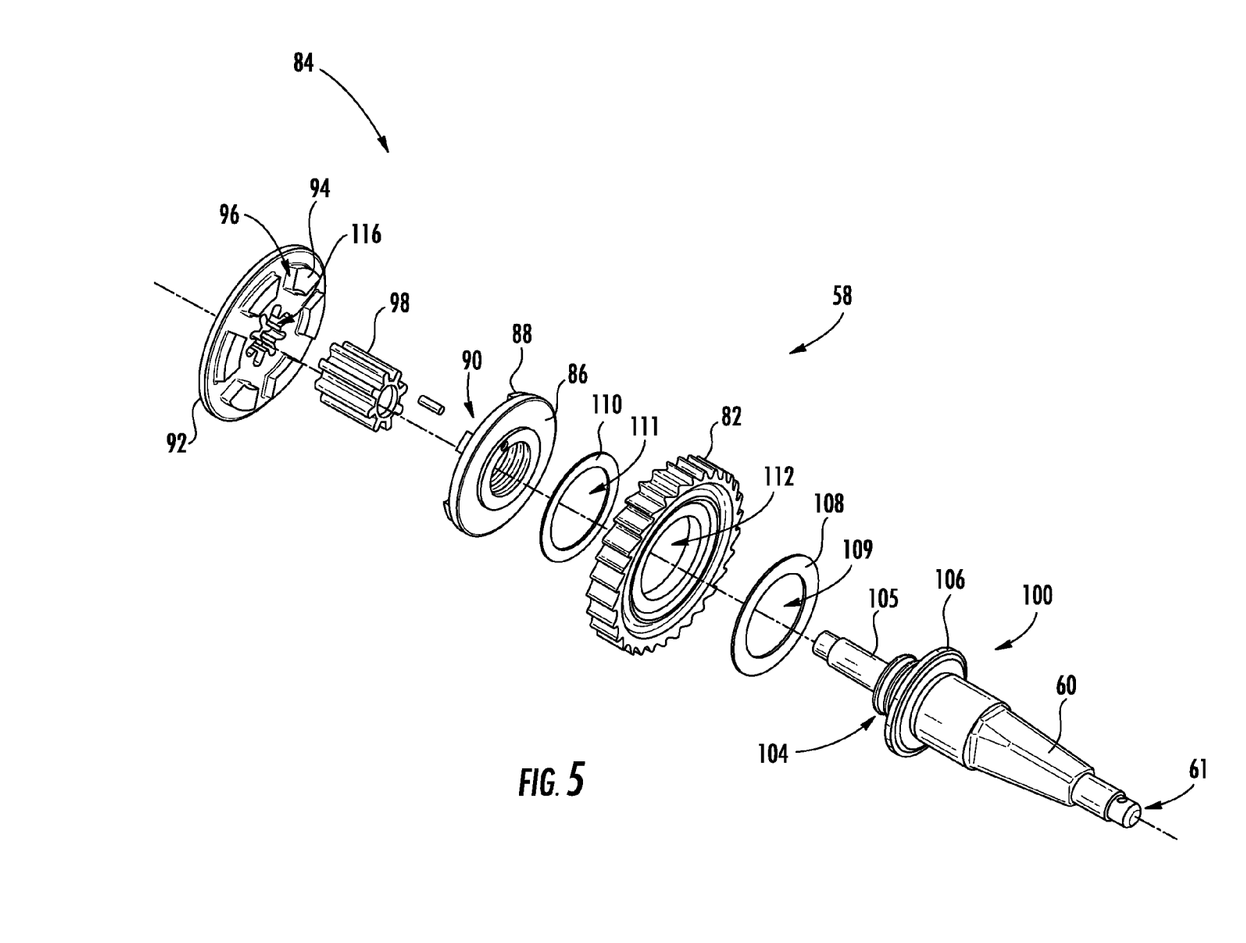
FIG. 5 provides an exploded perspective view of a shaft assembly portion of the hand brake assembly depicted in FIG. 1.

With reference now generally to FIGS. 2 through 5, operation of the gear train 16 will be explained in greater detail. As stated, FIGS. 2 and 3 provide an exploded perspective view of the hand brake assembly 10 and a cross-sectional view of the hand brake assembly 10, respectively. Additionally, FIG. 4 provides another cross-sectional view of the hand brake assembly 10, with a clutch mechanism 84 in a disengaged position, and FIG. 5 provides an exploded perspective view of a shaft assembly 58 of the hand brake assembly 10.

As stated, the gear train 16 further includes a shaft assembly 58 including a shaft 100. The shaft 100 defines a polygonal portion 60 at a second end 61 that corresponds in shape with an opening 68 of the first handle 66. A washer 63 and nut 64 are provided to rotationally fix the handle 66 to the second end 61 of the shaft 100 along an axial direction $A_1$.

Referring now particularly to FIG. 5, the shaft 100 further defines a radially extending flange 106, a threaded portion 104, and a cylindrically shaped portion 105. A second gear 82, or detent gear, is rotationally positioned on the shaft 100 between a first washer 108 and a second washer 110. The second gear 82 defines a cylindrically shaped opening 112 having a diameter greater than the threaded portion 104 of the shaft 100. The first and second washers 108, 110 similarly define cylindrically shaped openings 109 and 111 respectively. The second gear 82 is configured to interact with a pawl 77 (see FIG. 2) to prevent the second gear 82 from rotating in a loosening direction. The pawl 77 is mounted on a pawl shaft 72 and biased toward interacting with the second gear via a biasing spring 74 configured to interact with the housing 11. The pawl shaft 72 is mounted in a recess 80 defined in the back plate 12 and a recess 78 defined in the cover plate 14 (see FIGS. 2 and 4).

The shaft assembly 58 further includes a clutch mechanism 84 moveable between an engaged position (FIG. 3) and a disengaged position (FIG. 4). The clutch mechanism 84 includes a first clutch member 86 and a second clutch member 92. The first clutch member 86 defines a threaded opening 114 for receipt on the threaded portion 104 of the shaft 100. When the shaft 100 is rotated about its axis $A_1$ in a tightening direction by the first handle 66, the first clutch member 86 is tightened on the shaft 100 and moved towards the flange 106 defined by the shaft 100. This movement of the first clutch member 86 presses the second washer 110 against the second gear 82, the second gear 82 against the first washer 108, and the first washer 108 against the flange 106, such that the second gear 82 is rotationally fixed to the shaft 100 due to the friction between the parts. Tension on the chain 76 may hold the first clutch member 86 in position rotationally until the first clutch member 86 is sufficiently tightened. When the second gear 82 is rotationally fixed to the shaft 100, the pawl 77 and pawl shaft 72 generally prevent rotation of the second gear 82 and shaft 100 from rotating in a loosening direction.

The second clutch member 92 defines a geared opening 116 corresponding in shape with a pinion 98 rotationally mounted on the cylindrically shaped portion 105 of the shaft 100. Accordingly, the second clutch member 92 is rotationally fixed to the pinion 98, yet movable along the axial direction A1 with respect to the pinion 98. The pinion 98 is engaged with the first gear 48 such that rotational movement of the pinion 98 translates rotational movement to the first gear 48 (see FIGS. 3 and 4).

Moreover, as is depicted most clearly in FIG. 5, the first clutch member 86 defines a plurality of circumferentially spaced and axially extending teeth 88 with gaps 90 defined therebetween. Similarly, the second clutch member 92 defines a plurality of circumferentially spaced and axially extending teeth 94 with gaps 96 defined therebetween. When in the engaged position, as depicted in FIG. 3, the second clutch member 92 is positioned adjacent to the first clutch member 86, such that the teeth 94 and gaps 96 of the second clutch member 92 are geared with the teeth 88 and gaps 90 of the first clutch member 86. Thus, when in the engaged position, the first and second clutch members 86, 92 are rotationally fixed to one another with respect to the axial direction $A_1$ and the shaft 100. Such a configuration may allow the hand brake assembly 10 to engage the braking mechanism of a railway car (not shown) by rotating the first handle 66 in a clockwise direction (with respect to a front view of the assembly 10)/tightening direction to rotate the first gear 48, such that the chain 76 is wrapped around the shaft 50 and shortened. As the rotation of the shaft 100 in a tightening direction will rotationally fix the second gear 82 to the shaft 100, the second gear 82, or more particularly the pawl 77 and pawl shaft 72, may keep the braking mechanism tightened until released, as discussed below.

For the exemplary hand brake assembly 10 of FIGS. 2 through 5, the braking mechanism may be released in one of two ways: by rotating the first handle 66 in a counterclockwise direction (with respect to a front view of the assembly 10)/loosening direction; or by moving or rotating the quick-release handle 30 upward with respect to the shaft 34 and the axial direction $A_3$.

By rotating the first handle 66 in a counterclockwise direction, the first clutch member 86 is loosened with respect to the threaded portion 104 of the shaft 100. This loosening moves the first clutch member 86 away from the flange 106 of the shaft 100, allowing the shaft 100 to rotate with respect to the second gear 82. This in turn allows the shaft 100, the pinion 98 and the first gear 48 to all rotate in a loosening direction, independent of the second gear 82, pawl 77, and pawl shaft 72 such that the chain 76 may unwind from the first gear shaft 50. However, as the clutch 84 is in the engaged position, unwinding the chain 76 rotates the first gear 48, the pinion 98, and the first and second clutch mechanisms 86, 92. Accordingly, unwinding the chain 76 also re-tightens the first clutch member 86, again fixing second gear 82 to shaft 100. Accordingly, the first handle 66 must be continuously rotated in a loosening direction to fully release the brakes.

Alternatively, the brakes may be released by rotating the quick-release handle 30 upwards. The quick-release handle 30 is operatively connected to the clutch mechanism 84 and configured to move the clutch mechanism 84 into the disengaged position (FIG. 4).

Referring briefly to FIG. 2, when the quick-release handle 30 is rotated upward, the shaft 34 and cam 36 are rotated about the axial direction $A_3$, such that the cam 36 engages a lever, or bell crank 38. The bell crank 38 is pivotally mounted in the housing 11, the bell crank 38 including a top bar 44 and an attachment end 46. The top bar 44 and attachment end 46 pivot about a first pivot arm 40 and a second pivot arm 42. The first pivot arm 40 is received in a first recess 26 formed between removable panel 20 and cover plate 14 and second pivot arm 42 is received in a second recess 28 also formed between the removable panel 20 and the cover plate 14. Notably, by forming first and second recesses 26, 28 between removable panel 20 and cover plate 14, a user or operator may remove panel 20 and inspect bell crank 38 and/or shaft 34 and cam 36 of handle 30 without detaching all of cover plate 14 from back plate 12.

With reference now specifically to FIGS. 3 and 4, movement of the clutch assembly 84 to the disengaged position is depicted. As stated, FIG. 3 depicts the hand brake assembly 10 with the clutch mechanism 84 in the engaged position, while FIG. 4 depicts the clutch mechanism 84 in the disengaged position.

When the cam 36 engages the bell crank 38, the cam 36 presses the top bar 44 downward, rotating the bell crank 38 about the first and second pivot arms 40, 42, and moving the attachment end 46 to the left (with respect to the view of FIGS. 3 and 4). The attachment end 46 engages with the second clutch member 92 and moves the second clutch member 92 to the left as along the axial direction $A_1$ (FIG. 4). Movement of the second clutch member 92 to the left along the axial direction $A_1$ disengages the clutch assembly 84, such that the first gear 48 is no longer operatively engaged with the first handle 66 (i.e., is disengaged from the first handle 66) or the shaft 100 of the shaft assembly 58. The first gear 48 may thus rotate freely without regard to any rotation of the shaft 100 of the shaft assembly 58, allowing the brakes to be released.

The bell crank 38 is biased towards the right (with respect to the view of FIGS. 3 and 4) such that the clutch mechanism 84 is biased towards the engaged position, by a plurality of biasing springs 47. Accordingly, the quick-release handle 30 may need to be held upward to sustain a release of the hand brake assembly 10.

It should be appreciated, however, that the exemplary gear train 16 depicted in FIGS. 1 through 5 is by way of example only, and may, in other exemplary embodiments, have any other suitable configuration. For example, in other exemplary embodiments, the second gear 84 may be rotationally fixed to the shaft 100, and/or the second clutch member 86 may be fixed to the second gear 84. Additionally, or alternatively, the gear train 16 may include one or more additional or alternative pieces such that the gear train 16 includes a sustained release mechanism for maintaining the clutch mechanism 84 of the gear train 16 in the disengaged position once moved to the disengaged position by the quick-release handle 30. Such a feature is described in U.S. Pat. No. 7,757,825 and incorporated fully herein by reference.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A hand brake assembly for connection with a braking mechanism of a railway car, the hand brake assembly comprising:
   a gear train for engaging and disengaging the braking mechanism of the railway car;
   a quick-release handle operably connected to the gear train and including a shaft; and
   a housing enclosing at least a portion of the gear train and the shaft of the quick release handle, the housing comprising
      a back plate;
      a cover plate attached to the back plate; and
      a removable panel removably attached to one or both of the back plate and the cover plate, at least a portion of the shaft of the quick-release handle rotatably mounted in the housing by the removable panel when the removable panel is attached to the housing;
   wherein the quick-release handle is operable with a clutch mechanism of the gear train through a bell crank, wherein the bell crank defines a pair of pivot arms rotatably positioned in a respective pair of recesses defined at least in part by the removable panel and the cover plate.

2. The hand brake assembly of claim 1, wherein the quick-release handle further includes a cam positioned within the housing and extending outward from the shaft along a radial direction of the shaft, and wherein the quick-release handle is operable with the bell crank through the cam.

3. The hand brake assembly of claim 2, wherein the cam of the quick-release handle is operably connected to the clutch mechanism of the gear train and is configured to move the clutch mechanism to a disengaged position when the quick-release handle is rotated.

4. The hand brake assembly of claim 2, wherein the quick-release handle is a single piece formed by welding a plurality of parts together.

5. The hand brake assembly of claim 2, wherein the quick-release handle is a single piece formed by casting.

6. The hand brake assembly of claim 1, wherein the housing defines a top end and a bottom end, and wherein the removable panel is removably attached to one or both of the back plate and the cover plate at the top end of the housing.

7. The hand brake assembly of claim 1, wherein the removable panel defines a recess for receipt of a distal end of the shaft of the quick-release handle, and wherein the removable panel and the cover plate together define an opening through Which the shaft of the quick-release handle extends.

8. The hand brake assembly of claim 7, wherein the quick-release handle defines a cam extending outward from the shaft generally along a radial direction of the shaft, the cam positioned within the housing and preventing removal of the quick-release handle through the opening of the housing when the removable panel is attached to one or both of the back plate and the cover plate.

9. The hand brake assembly of claim 1, wherein the removable panel is attached to the cover plate.

10. The hand brake assembly of claim 1, wherein one or both of the back plate and the cover plate are formed by casting.

11. The hand brake assembly of claim 1, wherein the removable panel is removably attached to one or both of the back plate and the cover plate by a plurality of bolts.

12. The hand brake assembly of claim 1, wherein the housing defines a top end, a bottom end, and an opening at the bottom end, wherein at least a portion of the gear train extends through the opening, and wherein the housing further comprises a cover attached to the cover plate over the opening such that the gear train is completely enclosed by the housing.

13. The hand brake assembly of claim 1, wherein the gear train comprises a first gear operably connected to the braking mechanism of the railway car using one or more of a chain, a rope, a cord, and a wire.

14. A hand brake assembly for connection with a braking mechanism of a railway car, the hand brake assembly comprising:
   a housing comprising a back plate, a cover plate, and a panel removably attached to one or both of the back plate and the cover plate;

a first handle positioned outside the housing and adjacent to the housing;

a first gear rotatably mounted in the housing in operative engagement with the braking mechanism of the railway car;

a clutch moveable between an engaged position in which the first gear is operatively engaged with the first handle and a disengaged position in which the first gear is disengaged with the first handle; and a second, quick-release handle operatively connected to the clutch for moving the clutch into the disengaged position, the quick-release handle including a shaft, the panel of the housing mounting at least a portion of the shaft of the quick-release handle in the housing when the panel is attached to one or both of the back plate and the cover plate;

wherein the quick-release handle is operable with a clutch mechanism of the gear train through a bell crank, wherein the bell crank defines a pair of pivot arms rotatably positioned in a respective pair of recesses defined at least in part by the removable panel and the cover plate.

15. The hand brake assembly of claim 14, wherein the quick-release handle further defines a cam extending outwardly from the shaft along a radial direction of the shaft, the cam positioned within the housing for engaging the bell crank, and wherein the quick-release handle is formed integrally.

16. The hand brake assembly of claim 14, wherein the housing defines a top end and a bottom end, and wherein the panel is removably attached to one or both of the back plate and the cover plate at the top end of the housing.

* * * * *